(12) United States Patent
Alharbi et al.

(10) Patent No.: US 12,098,098 B1
(45) Date of Patent: Sep. 24, 2024

(54) INNOVATIVE CEMENTITIOUS COMPOSITES (ICC): HIGH-VOLUME RECLAIMED ASPHALT PAVEMENT AGGREGATE

(71) Applicant: KING SAUD UNIVERSITY, Riyadh (SA)

(72) Inventors: Yousef Rodaiman Alharbi, Riyadh (SA); Abdulrahman Sulaiman Albidah, Riyadh (SA); Galal Mohamed Fares, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/614,101

(22) Filed: Mar. 22, 2024

(51) Int. Cl.
| | | |
|---|---|---|
| C04B 18/20 | (2006.01) | |
| C04B 14/06 | (2006.01) | |
| C04B 14/48 | (2006.01) | |
| C04B 18/08 | (2006.01) | |
| C04B 18/14 | (2006.01) | |
| C04B 24/26 | (2006.01) | |
| C04B 28/02 | (2006.01) | |
| C04B 40/00 | (2006.01) | |
| C04B 103/32 | (2006.01) | |

(52) U.S. Cl.
CPC ........... *C04B 18/20* (2013.01); *C04B 14/068* (2013.01); *C04B 14/48* (2013.01); *C04B 18/08* (2013.01); *C04B 18/146* (2013.01); *C04B 24/2647* (2013.01); *C04B 28/02* (2013.01); *C04B 40/0046* (2013.01); *C04B 40/005* (2013.01); *C04B 2103/32* (2013.01)

(58) Field of Classification Search
CPC .............................. C04B 18/20; C04B 14/068
See application file for complete search history.

(56) References Cited

U.S. PATENT DOCUMENTS

| | | | | |
|---|---|---|---|---|
| 2021/0214277 | A1* | 7/2021 | Olivier | .................... C04B 28/34 |
| 2022/0064065 | A1* | 3/2022 | Beeman | ............. C04B 20/1077 |
| 2023/0033496 | A1* | 2/2023 | Townsend | ............... C04B 28/04 |

FOREIGN PATENT DOCUMENTS

| | | | | |
|---|---|---|---|---|
| CN | 104559254 | A | | 4/2015 |
| CN | 109824327 | A | | 5/2019 |
| CN | 110792239 | A | * | 2/2020 ............ C04B 28/04 |
| CN | 112777970 | A | | 5/2021 |

OTHER PUBLICATIONS

Harichane et al., "Effectiveness of the Use of Polymers in High-Performance Concrete Containing Silica Fume", Polymers, 2023, 15, 3730, https://doi.org/10.3390/polym15183730.

\* cited by examiner

*Primary Examiner* — Wenwen Cai
(74) *Attorney, Agent, or Firm* — Nath, Goldberg & Meyer; Joshua B. Goldberg

(57) ABSTRACT

An ultra-high-performance cement composites comprising cement, a polycarboxylate ether-based superplasticizer, fly ash, silica fume, reclaimed asphalt pavement granules, water and red sand. A very low water-to-binder ratio could be obtained using the polycarboxylate ether-based superplasticizer that overcomes the hydrophobic properties of reclaimed asphalt pavement and yields an ultra-high-performance cement composite.

19 Claims, 7 Drawing Sheets

FIG. 3G
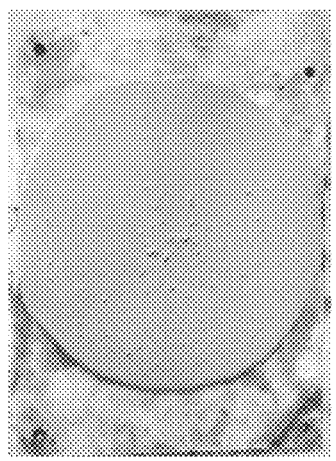 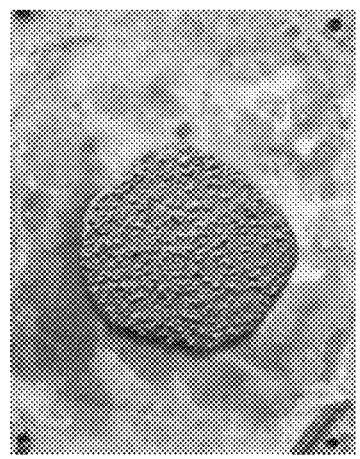 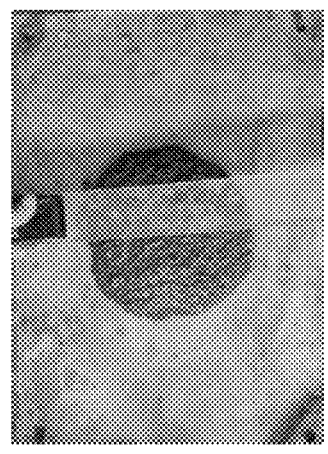
FIG. 4A          FIG. 4B          FIG. 4C

INNOVATIVE CEMENTITIOUS COMPOSITES (ICC): HIGH-VOLUME RECLAIMED ASPHALT PAVEMENT AGGREGATE

BACKGROUND

1. Field

The disclosure of the present patent application relates to a concrete composite, more specifically, a concrete composite including a high volume of reclaimed asphalt pavement (RAP) aggregates.

2. Description of the Related Art

In an effort to reduce the footprint of the construction industry on the environment, recent research investigated the potential of producing a green and sustainable cementitious composite. Therefore, by-product or recycled materials have been employed as ingredients in concrete mixes, e.g., recycled aggregates resulting from construction waste and demolition.

Reclaimed asphalt pavement (RAP) aggregates can be obtained because of the maintenance and removal of old asphalt pavements. RAP can comprise coarse and fine aggregates covered by asphalt film with a thickness between 6 μm and 9 μm. The employment of RAP aggregates in concrete production as a substitute for the natural aggregate can result in many benefits, including: (i) decreasing the demand on the natural aggregate and reserving the natural resources; (ii) reducing the greenhouse gas emissions caused by mining and quarrying natural aggregate; (iii) reducing the cost of transportation; (iv) improving sustainability for the concrete production; (v) saving land by reducing the waste sent to landfills; and (vi) improving the economy of the mixes.

Despite the benefits of utilizing RAP aggregate, a major drawback of employing RAP aggregate in concrete mixes is the significant drop in compressive strength and other mechanical properties, especially when high-volume replacement of natural aggregate by RAP is adopted. The reduced compressive strength in concrete containing RAP aggregate is attributed to the poor bond between the asphalt film and the cement paste, the incompatibility of organic and inorganic phases, and the cohesion failure of asphalt.

Previous research has utilized RAP aggregate in normal concrete to partially or fully substitute for natural fine aggregate. One method utilized RAP aggregate to replace natural aggregate, and the compressive strength dropped from 41.3 MPa to 19.1 MPa in mixes with full replacement of sand by fine RAP. In fact, this huge reduction in strength was observed while the content of the RAP aggregate represented about 36% of the total aggregate by weight. A study showed that full replacement of natural fine aggregate by fine RAP (size 0-5 mm) caused a reduction in the 28-day compressive strength of about 36.6% relative to the mix with 100% natural aggregate. Another group investigated the effect of replacing fine aggregate by fine RAP aggregate (size 0-5 mm) for producing cement mortars. Relative to the mix without RAP aggregate, the compressive strength was reduced for mixes with 100% RAP aggregates by 37.9%-41.7%, depending on the aggregate grading.

Research was also conducted on the effect of replacing coarse natural aggregate with coarse RAP aggregate. The experimental results of one group revealed that full replacement of coarse limestone by coarse RAP aggregate resulted in a strength reduction from 32.2 MPa to 14 MPa. The results in another group showed a compressive strength reduction from 41.3 MPa to 10.5 MPa when natural coarse aggregate was fully replaced by coarse RAP aggregate (that represents about 64% of the total aggregate weight). Another investigation showed a significant reduction in compressive strength of about 65% when natural coarse aggregate was fully replaced by coarse RAP aggregate. The experimental results of another group showed that substitution of coarse natural aggregate by RAP aggregate led to a decrease in compressive strength of 55%, 40%, and 39% (relative to the control mixes), which respectively contain fly ash, slag, and fly ash and slag. Another group reported a compressive strength reduction (relative to the control mix) of about 60% when 50% natural coarse aggregate was replaced by RAP aggregate.

It can be observed from the literature that mixes with full or large volume replacement of natural aggregate by RAP aggregate had generally low compressive strengths with cohesion failure of asphalt and similarly for other mechanical properties. At the same time, many studies reported a significant drop in the slump of the mixes containing RAP aggregate compared to the counterpart mixes with only virgin aggregate.

Thus, a new solution for concrete composites using RAP aggregate with high compressive strength is desired.

SUMMARY

The present subject matter relates to a concrete composite with a high-volume of reclaimed asphalt pavement (RAP). It has not been previously reported that RAP can be used in high volumes to manufacture an ultra-high performance concrete (UHPC) mix, as is described herein. Using a modified mini-slump test, the UHPC mix described herein with a high RAP volume can exhibit a high flowability of up to 240 mm. The elevated quality of the devised mix can be attributed to the quality of the fused interstitial transition zone (FITZ). This zone is developed through the interaction mechanism between the ultra-high-performance cementitious matrix integrated with RAP aggregates. The role of the superplasticizer is critical to the quality of FITZ.

Accordingly, in an embodiment, the present subject matter relates to a concrete composite comprising cement, superplasticizer, fly ash, silica fume, reclaimed asphalt pavement (RAP) granules, water, red sand, and microsteel fibers.

The present subject matter also relates to a method of making a cement composite, the method comprising: mixing water with an optimal superplasticizer dosage for initial flowability; adding fly ash to the water and the optimal superplasticizer dosage to create a first mixture; stirring the first mixture; adding cement to the first mixture to obtain a second mixture; stirring the second mixture in a high-shear mixer; gently adding silica fume to the second mixture to obtain a third mixture and stirring the third mixture; gradually adding reclaimed asphalt pavement (RAP) granules to the third mixture to obtain a fourth mixture; stirring the fourth mixture; adding micro-steel fibers to the fourth mixture to obtain a fifth mixture; measuring an initial flowability of the fifth mixture; and casting the fifth mixture into a target mold to obtain a cement composite.

These and other features of the present subject matter will become readily apparent upon further review of the following specification.

BRIEF DESCRIPTION OF DRAWINGS

FIG. 3A=S1=0.1-0.4 mm; FIG. 3B=S2=0.2-0.6 mm; FIG. 3C=S3=0.7-1.1 mm; FIG. 3D=S3=1.1-1.2 mm; FIG. 3E=1.2 mm-2.5 mm; FIG. 3G=S7=4-6.3 mm.

FIGS. 4A, 4B, and 4C are embodiments of optimization of the RAP-UHPC mix following the maximum tolerance approach. FIG. 4A shows gradual addition of RAP. FIG. 4B shows maximum content of RAP with target flow. FIG. 4C shows MSF addition until target flow was achieved.

DETAILED DESCRIPTION OF THE PREFERRED EMBODIMENTS

Figure 1:
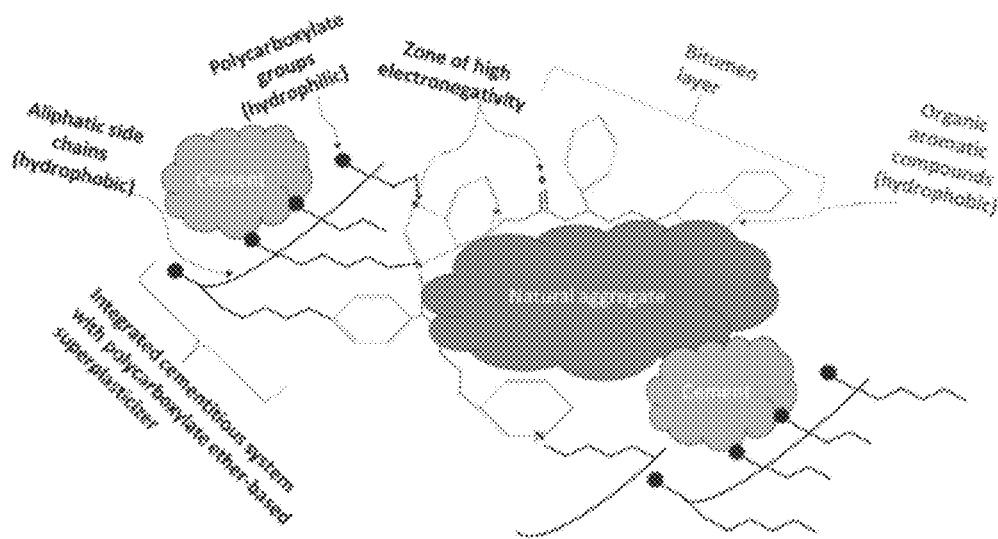
FIG. 1 is a schematic of an embodiment of a concrete composite as described herein.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Asphalt is composed of bitumen, filler, and aggregates. Bitumen is composed of organic compounds from the distillation of petroleum. Asphalt contains two main components: maltenes, which are subdivided into aromatic compounds and resins, and asphaltenes (aromatic compounds based on carbon, nitrogen, and sulfur with a few hydroxyl groups). These aromatic compounds can be chemically integrated with polycarboxylate ether-based compounds and any other similar compounds.

The present subject matter relates to a concrete mixture that includes an integrated cementitious matrix and a superplasticizer that serves as a hydrophilic-hydrophobic dual linker between the cement and the organic portion of the optimized asphalt granules (bitumen) through electronegativity (nitrogen, sulfur, and oxygen) and intermolecular forces (hydrogen bonds), as illustrated in FIG. 1. Therefore, with a very low water-to-cement ratio, a significant amount of polycarboxylate ether-based superplasticizer becomes mandatory for flowable cementitious mixes. At these elevated dosages of superplasticizer, a highly effective fused interstitial transition zone (FITZ) with improved hybrid properties can be formed. Most of the problems associated with the organic portion of asphalt might be resolved using the composition as described herein.

In an embodiment, the present subject matter relates to a concrete composite comprising cement, superplasticizer, fly ash, silica fume, reclaimed asphalt pavement (RAP) granules, water, red sand, and microsteel fibers.

In one embodiment, the superplasticizer may be a polycarboxylate ether-based superplasticizer.

In another embodiment, the concrete composite may include between about 30% to about 40% cement by weight.

In a further embodiment, the concrete composite may include between about 20 to about 30 L/m$^3$ superplasticizer.

In an embodiment, the concrete composite may include between about 4% to about 9% fly ash.

In another embodiment, the concrete composite may include between about 2% to about 5% silica fume.

In a further embodiment, the concrete composite may include between about 25% to about 40% RAP.

In an embodiment, the concrete composite may include between about 1% to about 4% red sand.

In another embodiment, the concrete composite may include between about 0.5 to about 2% microsteel fibers.

The present subject matter also relates to a method of making a cement composite, the method comprising: mixing water with an optimal superplasticizer dosage for initial flowability; adding fly ash to the water and the optimal superplasticizer dosage to create a first mixture; stirring the first mixture; adding cement to the mixture to obtain a second mixture; stirring the second mixture in a high-shear mixer; gently adding silica fume to the second mixture to obtain a third mixture and stirring the third mixture; gradually adding reclaimed asphalt pavement (RAP) granules to the third mixture to obtain a fourth mixture; stirring the fourth mixture; adding micro-steel fibers to the fourth mixture to obtain a fifth mixture; measuring the initial flowability of the fifth mixture; and casting the fifth mixture into a target mold to obtain a cement composite.

In an embodiment, the initial flowability may be about 200 mm to about 240 mm.

In another embodiment of the present subject matter, stirring the first mixture may last for at least about 1 minute, or about 1 minute.

In a further embodiment, stirring the second mixture in the high shear mixer may last for about 2 minutes.

In a still further embodiment, stirring the third mixture in the high shear mixer may last for about 3 minutes.

In an embodiment, stirring the fourth mixture may last for about 2 minutes.

In another embodiment, measuring the flowability of the fifth mixture may include but is not limited to a modified mini-slump cone.

In a further embodiment, the target mold may include but is not limited to one of a prism shape and a cube shape.

In a still further embodiment, the fourth mixture comprises between about 30% to about 40% cement by weight, between about 20-30 L/m$^3$ of superplasticizer, between about 4% to about 9% fly ash, between about 2% to about 5% silica fume, between about 25% to about 40% RAP, and between about 1% to about 4% red sand.

In one embodiment, a median size of the red sand may not exceed about 300 microns, or 300 microns.

In another embodiment, a median size of the RAP may be less than about 3 mm, or less than 3 mm.

The following examples illustrate the present teachings.

Example 1

Method of Mixing Concrete Composite

This method relied on two main concepts: reducing mixing water to the lowest possible level and increasing the superplasticizer dosage to deliver two benefits: high flowability and an efficient linker between hydrated cement and the organic part in asphalt granules. The sequence of mixing procedure is summarized below:
1. Pour water into the bowl with the optimum superplasticizer dosage for an initial flowability of about 220±20 mm.
2. Add fly ash first and stir for 1 minute, followed by cement for 2 minutes in a high-shear mixer.
3. Then, gently insert silica fume and mix for another 3 minutes in a high shear mixer, followed by the gradual addition of asphalt granules in two minutes.
4. Adding the optimized micro-steel fibers, if exists, gradually for 1 minute
5. Measuring the followability using the modified mini-slump cone
6. Cast the mix into the target molds.

Example 2

Reclaimed Asphalt Pavement (RAP) Aggregate

Figure 2:
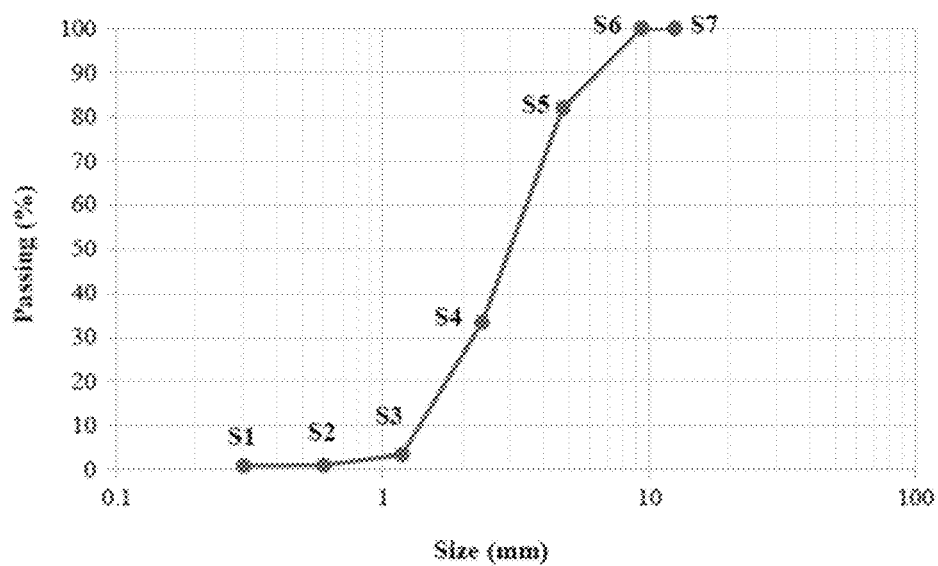
FIG. 2 is a graph of a sieve analysis of RAP aggregate.
Figure 3A:
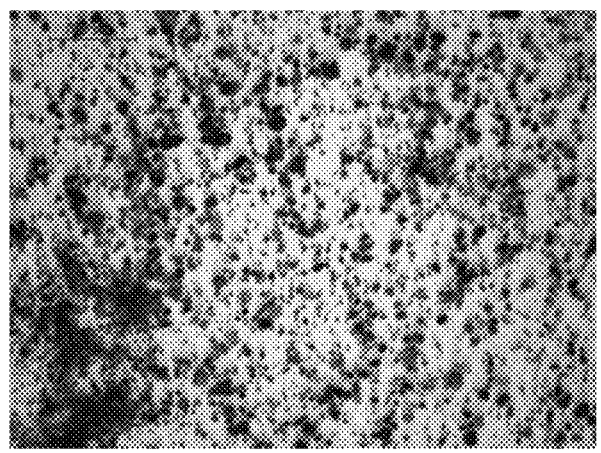
FIGS. 3A, 3B, 3C, 3D, 3E. 3F, and 3G are optical microscope pictures of the RAP in each of the different sizes of the groups in FIG. 2.
Figure 3B:
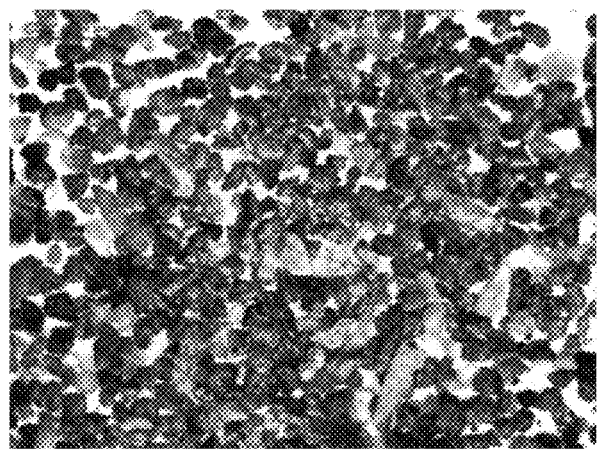
Figure 3C:
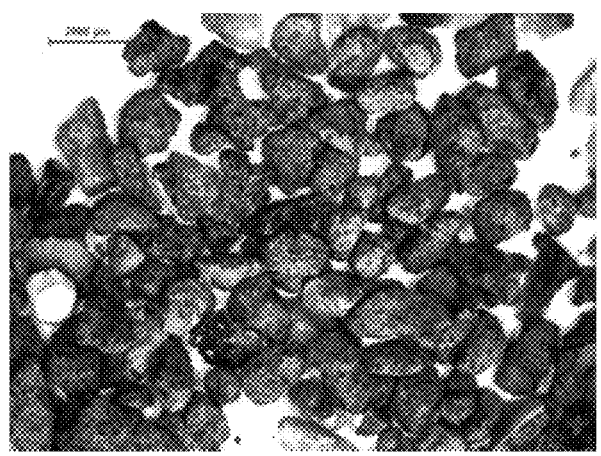
Figure 3D:
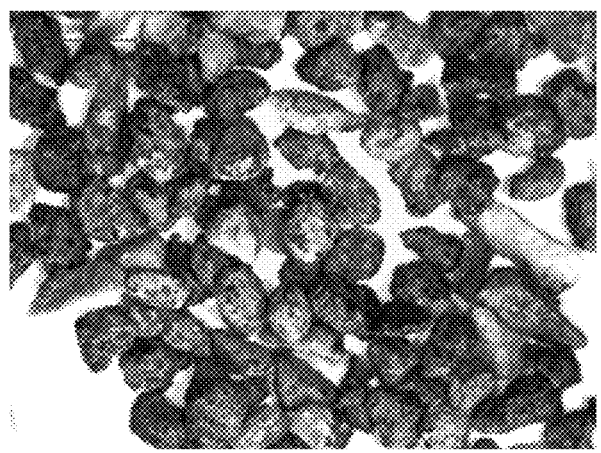
Figure 3E:
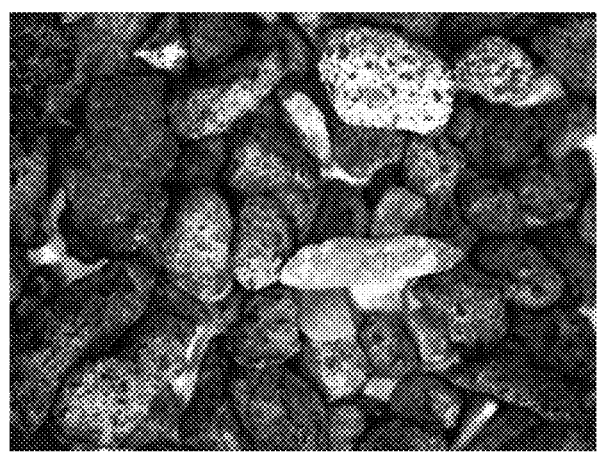
Figure 3F:
FIG. 3F=S6=1.7-4 mm.

The sieve and microscopic analysis of RAP are shown in FIGS. 2 and 3, respectively. The sieve analysis shown in FIG. 2 is divided into seven sizes of zones that are monitored using an optical microscope. The range of particle sizes is visualized in each zone, as in FIG. 3.

Example 3

Mix Composition

The determination of the mix composition was conducted following the concept described herein, which relies on the maximum tolerance of the mix to accept an additional component while maintaining the target flow, as depicted in FIG. 4. The paste was prepared first, followed by the gradual addition of RAP aggregates until apparent followability was achieved, followed by the addition of micro-steel fibers (MSF) if used, as depicted in FIG. 4.

Based on this protocol, the final mix composition could be defined, as presented in Table 1. The binder content varied between 800 and 1200 kg/m$^3$ with the cement content varying between 600 and 900 kg/m$^3$. However, limestone dust can replace up to 40% of the cement content. Fly ash (FA) and silica fume (SF) varied between 4-9% and 2-5%, respectively. RAP varied between 25 and 40% of the total weight of the mix, while red sand (RS) varied between 1 and 4%. Superplasticizer dosage varied between 20 and 30 L/m$^3$. The volume content of microsteel fibers (MSF) varied between 0.5 and 2%.

TABLE 1

Table 1. An example of the optimized mix composition given in kg/m$^3$

| Cement | FA | SF | RAP | RS | W | SP | MSF |
|---|---|---|---|---|---|---|---|
| 885 | 196 | 75 | 877 | 66 | 198 | 24 | 99 |

Example 4

Optimization in RAP Content

Figure 5:
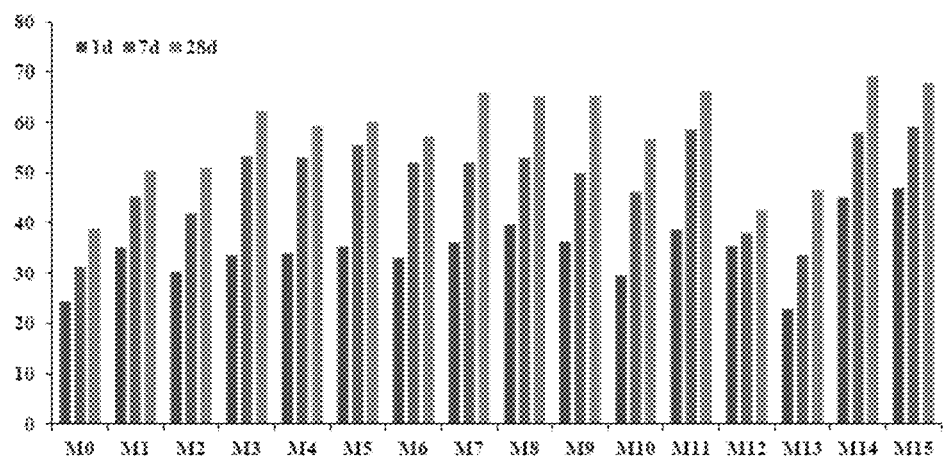
FIG. 5 is a graph showing the development of compressive strength over time for various mixes containing different asphalt aggregate contents.

The variation in the RAP content was monitored in different UHPC mixes (M0-M15) at different curing ages of 1, 7 and 28 days, as presented in Tables 2. The results are shown in FIG. 5.

TABLE 2

RAP and red sand content in the mixes M0 to M15

| Mix I.D. | RAP (wt %) | Red Sand (wt %) |
|---|---|---|
| M0 | 40.64 | 0 |
| M1 | 40.12 | 3 |
| M2 | 39.07 | 6 |
| M3 | 37.13 | 11 |
| M4 | 33.78 | 20 |
| M5 | 38.12 | 3 |
| M6 | 35.02 | 6 |
| M7 | 28.82 | 12 |
| M8 | 16.44 | 24 |
| M9 | 40.63 | 0 |
| M10 | 37.63 | 3 |
| M11 | 32.79 | 5.5 |
| M12 | 29.79 | 10 |
| M13 | 29.81 | 10 |
| M14 | 32.38 | 5 |
| M15 | 29.22 | 10 |

Figure 6:
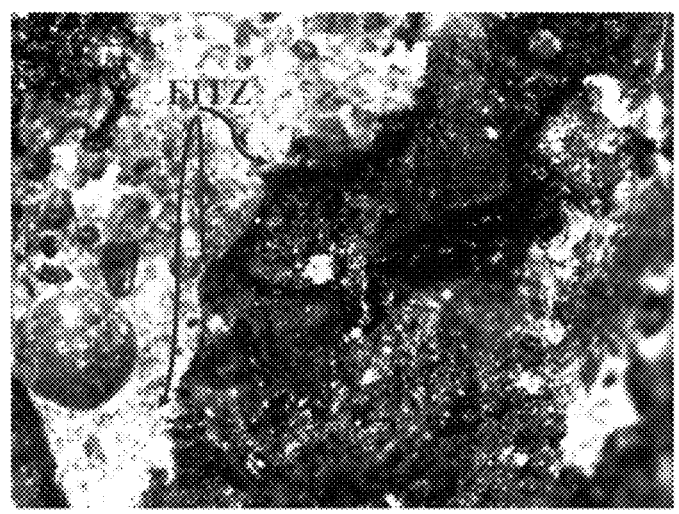
FIG. 6 shows the fused interstitial transition zone (FITZ) matrix.

The fractured surfaces of concrete were analyzed using an optical microscope. The results confirmed that nearly no interstitial transition zone could be observed, which is identified as fused (FITZ) as demonstrated in FIG. 6.

Fiber Reinforced Mixes

Different mixes with different RAP contents (27.5-37%) and MSF dosages varying from 0 to 4.8% were prepared for compressive strength and flexural properties, as per the values shown in Table 3. The compressive strengths of the mixes are shown in FIG. 7.

Compressive Strength

Figure 7:
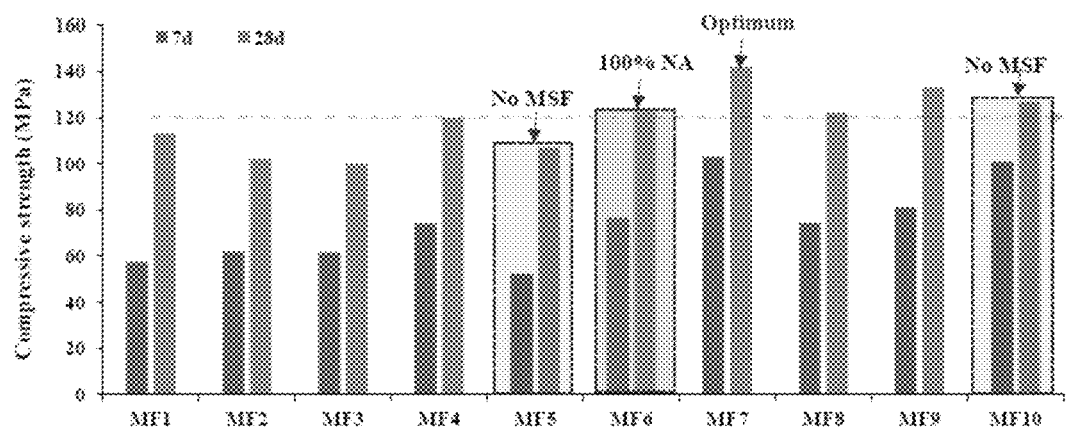
FIG. 7 is a graph showing the development of compressive strength over time for different mixes containing different asphalt aggregate contents and micro-steel fiber.

As illustrated in Table 3 and FIG. 7, a strength over 140 MPa can be obtained with a high volume of RAP aggregates (27.5%).

TABLE 3

|  | MF1 | MF2 | MF3 | MF4 | MF5 | MF6 | MF7 | MF8 | MF9 | MF10 |
|---|---|---|---|---|---|---|---|---|---|---|
| Asph Agg4* | 36.00 | 35.71 | 35.43 | 34.51 | 37.21 | 34.33*** | 27.52 | 30.29 | 33.06 | 35.40 |
| Asp powder** | 0.00 | 0.00 | 0.00 | 0.00 | 2.79 | 2.58 | 9.14 | 6.39 | 3.64 | 0.00 |
| RS | 2.70 | 2.68 | 2.66 | 5.18 | 8.38 | 7.73 | 0.00 | 0.00 | 0.00 | 2.87 |
| MSF | 3.24 | 4.02 | 4.79 | 4.66 | 0.00 | 3.87 | 4.13 | 4.13 | 4.13 | 0.00 |

UHPC mixes with RAP and MSF (% wt )
*Asphalt aggregate of maximum size of 6.3 mm.
**Fine asphalt aggregate of maximum size of 0.6 mm
***Asphalt aggregate is replaced by natural one (NA)

Flexural Properties

Figure 8:
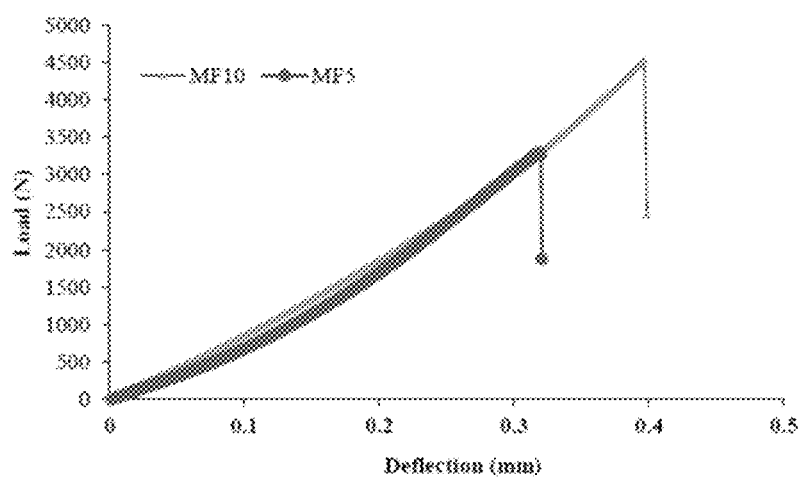
FIG. 8 is a graph showing the flexural properties of the mixes without fibers (MF5 and MF10) at 28 days of curing.
Figure 9:
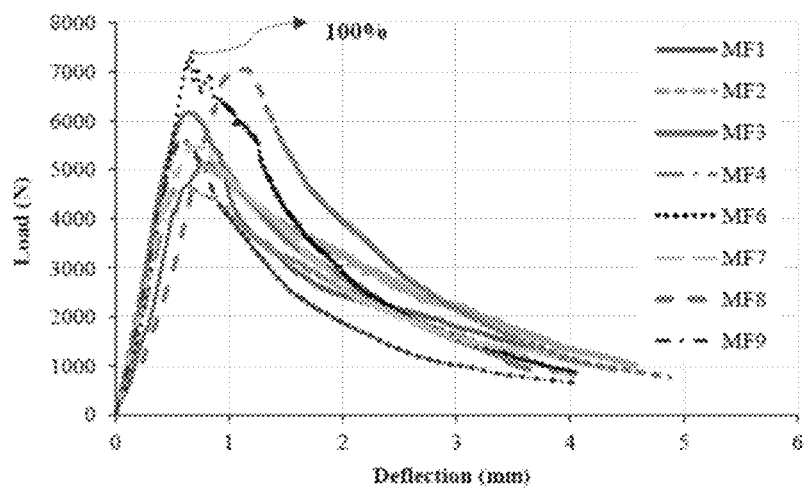
FIG. 9 is a graph of flexural properties of the mixes with fibers at 28 days of curing compared to the mix with 100% natural aggregate.

The flexural properties are shown in FIGS. 8 and 9. FIG. 8 confirms that a minimum amount of RS is preferable. Moreover, it is possible to obtain comparable flexural properties in the mix with high-volume RAP aggregates to those in the mix with 100% natural aggregate. This will make the recycling of high-volume reclaimed asphalt pavement aggregates feasible and beneficial.

It is to be understood that the concrete composite and method of making the concrete composite described herein is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A cement composite, comprising:
   cement, a polycarboxylate ether-based superplasticizer, fly ash, silica fume, reclaimed asphalt pavement (RAP) granules, water, and red sand; wherein the cement composite comprises between about 25% to about 40% RAP.

2. The composite of claim 1, comprising between about 30% to about 40% cement by weight.

3. The composite of claim 1, comprising between about 20-30 L/m$^3$ of the polycarboxylate ether-based superplasticizer.

4. The composite of claim 1, comprising between about 4% to about 9% fly ash.

5. The composite of claim 1, comprising between about 2% to about 5% silica fume.

6. The composite of claim 1, comprising between about 1% to about 4% red sand.

7. The composite of claim 1, further comprising between about 0.5 to about 2% microsteel fibers.

8. A method of making a cement composite, the method comprising:
   mixing water with a polycarboxylate ether-based superplasticizer dosage for initial flowability;
   adding fly ash to the water and the polycarboxylate ether-based superplasticizer dosage to create a first mixture;
   stirring the first mixture;
   adding cement to the first mixture to obtain a second mixture;
   stirring the second mixture in a high-shear mixer;
   gently adding silica fume to the second mixture to obtain a third mixture and stirring the third mixture;
   gradually adding reclaimed asphalt pavement (RAP) granules and red sand to the third mixture to obtain a fourth mixture;
   stirring the fourth mixture;
   optionally adding micro-steel fibers to the fourth mixture to obtain a fifth mixture;
   optionally measuring an initial flowability of the fifth mixture; and
   casting the fourth mixture or the fifth mixture, if made, into a target mold to obtain a cement composite.

9. The method of claim 8, wherein the method includes the steps of:
   adding micro-steel fibers to the fourth mixture to obtain a fifth mixture;

measuring an initial flowability of the fifth mixture; and
casting the fifth mixture into a target mold to obtain a cement composite.

10. The method of claim 8, wherein the initial flowability is about 200 mm to 240 mm.

11. The method of claim 8, wherein stirring the first mixture lasts for about 1 minute.

12. The method of claim 8, wherein stirring the second mixture in the high shear mixer lasts for about 2 minutes.

13. The method of claim 8, wherein stirring the third mixture in the high shear mixer lasts for about 3 minutes.

14. The method of claim 8, wherein stirring the fourth mixture lasts for about 2 minutes.

15. The method of claim 9, wherein measuring the flowability of the fifth mixture comprising using a modified mini-slump cone.

16. The method of claim 8, wherein the target mold comprises one of a prism shape and a cube shape.

17. The method of claim 8, wherein the fourth mixture comprises between 30% to 40% cement by weight, between 20-30 $L/m^3$ of the polycarboxylate ether-based superplasticizer by weight, between 4% to 9% fly ash by weight, between 2% to 5% silica fume by weight, between 25% to 40% RAP by weight, and between 1% to 4% red sand by weight.

18. The method of claim 9, wherein a median size of the red sand does not exceed 300 microns.

19. The method of claim 9, wherein a median size of the RAP is less than 3 mm.

\* \* \* \* \*